United States Patent
Roche et al.

(10) Patent No.: US 10,666,527 B2
(45) Date of Patent: May 26, 2020

(54) GENERATING SPECIFICATIONS FOR MICROSERVICES IMPLEMENTATIONS OF AN APPLICATION

(71) Applicant: EMC IP Holding Company LLC, Hopkinton, MA (US)

(72) Inventors: Ian Gerard Roche, Glanmire (IE); Sean Creedon, Ballincollig (IE)

(73) Assignee: EMC IP Holding Company LLC, Hopkinton, MA (US)

(*) Notice: Subject to any disclaimer, the term of this patent is extended or adjusted under 35 U.S.C. 154(b) by 184 days.

(21) Appl. No.: 15/963,432

(22) Filed: Apr. 26, 2018

(65) Prior Publication Data
US 2019/0334789 A1    Oct. 31, 2019

(51) Int. Cl.
| | | |
|---|---|---|
| H04L 12/24 | (2006.01) | |
| H04L 29/08 | (2006.01) | |
| G06N 20/00 | (2019.01) | |
| G06F 17/27 | (2006.01) | |
| G06K 9/62 | (2006.01) | |
| G06F 9/54 | (2006.01) | |

(52) U.S. Cl.
CPC .......... *H04L 41/5054* (2013.01); *G06F 9/546* (2013.01); *G06F 17/2705* (2013.01);
(Continued)

(58) Field of Classification Search
CPC ..... H04L 41/5054; H04L 67/16; H04L 67/32; H04L 67/2819; H04L 41/5058;
(Continued)

(56) References Cited

U.S. PATENT DOCUMENTS

| | | | |
|---|---|---|---|
| 2018/0270125 A1* | 9/2018 | Jain | G06F 11/30 |
| 2018/0288129 A1* | 10/2018 | Joshi | H04L 43/08 |

(Continued)

OTHER PUBLICATIONS

"Oracle database 630, LogMiner", downloaded from (https://docs.oracle.com/cd/B19306_01/server.102/b14215/logminer.htm#sthref1875) on Apr. 20, 2018.
(Continued)

*Primary Examiner* — Joe Chacko
(74) *Attorney, Agent, or Firm* — Ryan, Mason & Lewis, LLP

(57) ABSTRACT

Techniques are provided for generating specifications for a microservice implementation of an existing application. An exemplary method comprises: analyzing request data and corresponding response data for an application implemented as a monolithic application and/or a Service Oriented Architecture application to generate data features; parsing an audit log and/or a transaction log of the application to identify interactions with a data store; clustering the data store interactions using an unsupervised learning technique to identify patterns of usage of the data store; selecting one or more service types to generate using a trained supervised machine learning model for the requests, the corresponding response data and the data store interactions; and generating an application programming interface specification, a data model specification and/or a message specification for the selected service types for a microservice implementation of the application. A run-time environment, a data definition language and/or message queues are optionally generated for the one or more selected service types.

20 Claims, 11 Drawing Sheets

(52) U.S. Cl.
CPC .......... *G06K 9/6218* (2013.01); *G06N 20/00* (2019.01); *H04L 41/5058* (2013.01); *H04L 67/16* (2013.01); *H04L 67/2819* (2013.01); *H04L 67/32* (2013.01)

(58) Field of Classification Search
CPC ... G06K 9/6218; G06F 17/2705; G06F 9/546; G06F 11/34; G06N 20/00
See application file for complete search history.

(56) References Cited

U.S. PATENT DOCUMENTS

| | | | | |
|---|---|---|---|---|
| 2018/0324204 | A1* | 11/2018 | McClory | G06F 9/5027 |
| 2019/0018671 | A1* | 1/2019 | Zhu | H04L 67/1008 |
| 2019/0236485 | A1* | 8/2019 | Stanley, III | H04L 67/10 |

OTHER PUBLICATIONS

"Oracle Streams", downloaded from (https://docs.oracle.com/cd/B19306_01/server.102/b14229/strms_over.htm#i1006084) can be used in the Oracle log parser 615-1 on Apr. 20, 2018.
"Swagger/OpenAPI", downloaded from https://swagger.io/specification/ on Apr. 20, 2018.
"IBM Mobile Foundation", downloaded from https://www.ibm.com/cloud/mobile-foundation on Apr. 20, 2018.
"Redgate Database DevOps", downloaded from https://www.redgate.com/blog/database-devops on Apr. 20, 2018.

* cited by examiner

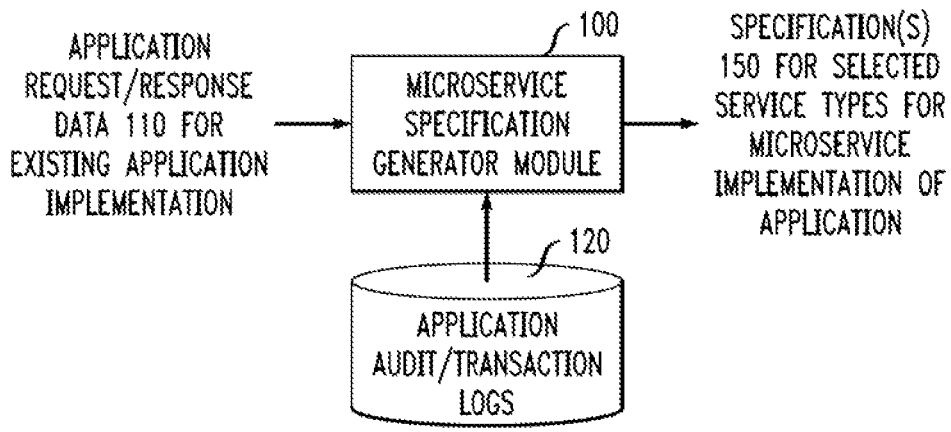

200:
210: ANALYZE SOURCE REQUEST/RESPONSE DATA 110 (FIG. 5):
- INTERPRET INBOUND REQUESTS;
- READ RESPONSES; AND
- COMBINE INTO FEATURES.

220: MINING OF AUDIT/TRANSACTION LOGS 120 (FIG. 6):
- READ TRANSACTION LOGS; AND
- GROUP RELATED READS/WRITES/UPDATES/DELETES TO OBTAIN DATA STORE INTERACTIONS.

230: CATEGORIZATION OF SERVICE TYPE(S) (FIGS. 7-11):
- CLUSTER READS AND WRITES OF SIMILAR PERSISTENT OBJECTS;
- CATEGORIZE SERVICE (USING SUPERVISED MACHINE LEARNING); AND
- PREDICT TYPE OF MICROSERVICES TO GENERATE.
- DEFINE PERSISTENCE TYPE.
- GENERATE OF API, DATA MODEL AND/OR MESSAGE SPECIFICATIONS 150.

240: MICROSERVICE GENERATION OF (FIGS. 12-13):
- GENERATE REQUIRED MICROSERVICES FOR TARGET RUN-TIME ENVIRONMENT.

FIG. 9

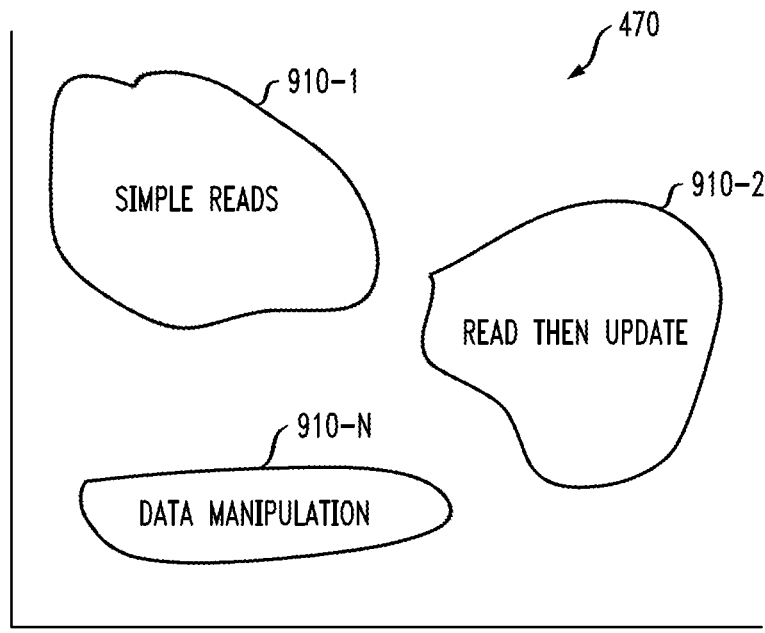

FIG. 10

- GROUP BY USERNAME OF THE CALLING APPLICATION.

- GROUP DATA BY PID (PROCESS ID) TO SEE WHICH QUERIES ARE PART OF THE SAME PROCESS.

- LOOK AT IP ADDRESSES TO DISTINGUISH HOW MANY INSTANCES OF THE CURRENT SERVICE IS RUNNING.

- ORDER BY TIMESTAMP TO SEE GROUPINGS THAT HAPPEN AT A SIMILAR TIME FRAME WHICH MAY BE PART OF A BATCH RUN.

- PARSE THE QUERIES BEING USED TO DETECT TABLES AND IF ANY JOINS IN USE.

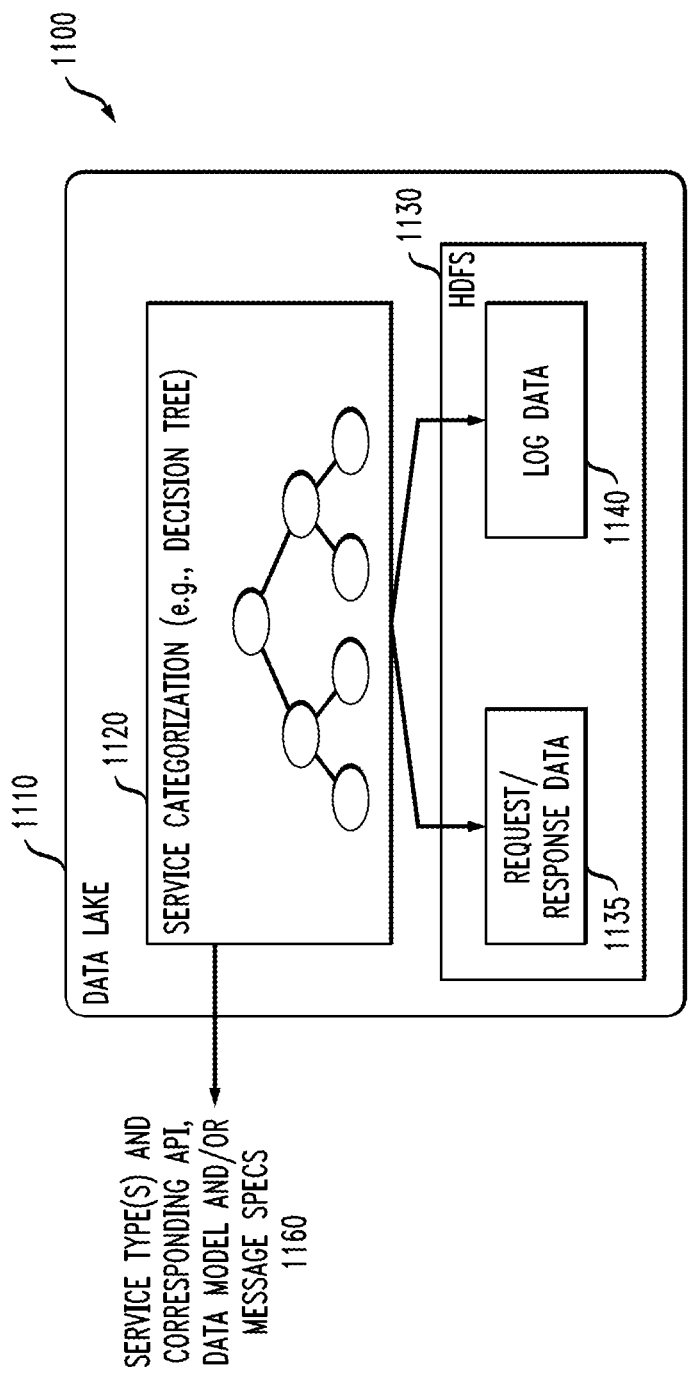

GENERATING SPECIFICATIONS FOR MICROSERVICES IMPLEMENTATIONS OF AN APPLICATION

FIELD

The field relates generally to information processing systems and software.

BACKGROUND

Applications have evolved from monolithic platforms to Service Oriented Architecture (SOA) platforms, and more recently, to microservices platforms. As applications transition to microservices platforms, they benefit from, for example, looser coupling, easier maintenance and more scalable solutions. It is often costly and challenging, however, to transition existing applications to a microservices platform.

A need therefore exists for techniques for generating one or more specifications for a microservices implementation of an existing application.

SUMMARY

Illustrative embodiments of the present disclosure generate one or more specifications for a microservice implementation of an existing application. In one embodiment, an exemplary method comprises: analyzing request data and corresponding response data for at least one application implemented as one or more of a monolithic application and a Service Oriented Architecture application to generate one or more data features; parsing one or more of an audit log and a transaction log of the at least one application to identify one or more interactions with a data store; clustering the one or more data store interactions using an unsupervised learning technique to identify one or more patterns of usage of the data store; selecting one or more service types to generate using one or more trained supervised machine learning models for the requests, the corresponding response data and the data store interactions; and generating at least one of an application programming interface specification, a data model specification and a message specification for the one or more selected service types for a microservice implementation of the at least one application.

In some embodiments, the analyzing employs an interceptor for each running application to intercept the requests and the corresponding response data, and the parsing employs a distinct parser for each log source type. In at least one embodiment, the clustering groups the data store interactions based on one or more of an identifier of a calling application, a process identifier, a network address, a timestamp and one or more join operations.

In one embodiment, a run-time environment, a data definition language and one or more message queues are optionally generated based on, respectively, the application programming interface specification, the data model and the message specification for the one or more selected service types.

Other illustrative embodiments include, without limitation, apparatus, systems, methods and computer program products comprising processor-readable storage media.

BRIEF DESCRIPTION OF THE DRAWINGS

FIG. 1 illustrates an exemplary microservice specification generator module, according to an embodiment of the disclosure;

FIG. 2 illustrates exemplary pseudo code for a microservice specification generation process, according to one embodiment of the disclosure;

FIG. 9 illustrates the functionality of the cluster identification module of FIG. 4 in further detail, according to an embodiment;

FIG. 10 illustrates a number of exemplary techniques for identifying patterns as part of the cluster identification of FIG. 9, according to one or more embodiments of the disclosure;

FIG. 11 illustrates an exemplary implementation of the service categorization module of FIGS. 4 and 7 in further detail, according to one embodiment;

DETAILED DESCRIPTION

Figure 3:
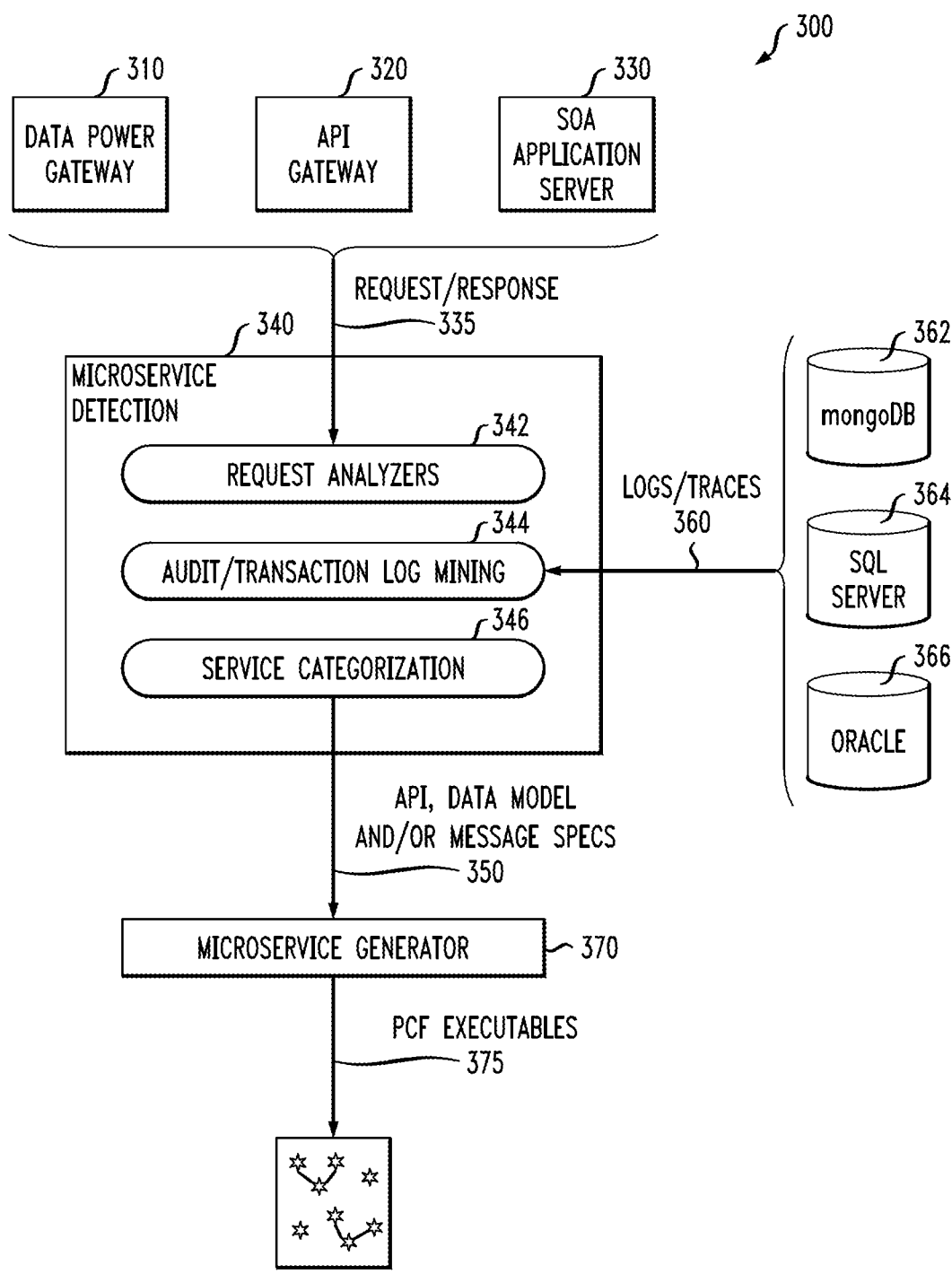
FIG. 3 is a flow chart illustrating an exemplary implementation of a microservice specification generation process, according to an embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating one or more specifications for a microservices implementation of an existing application.

One or more embodiments of the disclosure automatically generate an application programming interface (API) specification, a data model specification and/or a message specification for a microservices implementation of an existing application that is implemented, for example, as a monolithic application (e.g., on a Monolith platform) or an SOA application (e.g., on an SOA platform).

In one or more embodiments, request and corresponding response data are analyzed for an application implemented using monolithic or SOA platforms. In addition, an audit log and/or a transaction log of the application are parsed to identify interactions with a data store. The data store interactions are then clustered using an unsupervised learning technique to identify one or more patterns of usage of the data store. Trained supervised machine learning models are used to select one or more service types to generate for the requests, the corresponding response data and the data store interactions. Finally, an application programming interface specification, a data model specification and/or a message specification are generated for the selected service types for a microservice implementation of the application.

FIG. 1 illustrates an exemplary microservice specification generator module 100, according to an embodiment of the disclosure. As shown in FIG. 1, the exemplary microservice specification generator module 100 processes (i) application request/response data 110 for an existing application implementation, such as a non-microservices or legacy implementation (e.g., a monolithic or Service Oriented Architecture implementation of the existing application), and (ii) audit logs and/or transaction logs 120 of the application, as discussed further below in conjunction with FIGS. 5 and 6, respectively. In one or more embodiments, the exemplary microservice specification generator module 100 generate specification(s) 150 (e.g., API, data model and/or message specifications) for the selected service types for a microservice implementation of the application (for example, on a Microservice platform).

FIG. 2 illustrates exemplary pseudo code for a microservice specification generation process 200, according to one embodiment of the disclosure. As shown in FIG. 2, the exemplary microservice specification generation process 200 initially analyzes the source request/response data 110 for the application during step 210 to generate data features, as discussed further below in conjunction with FIG. 5. Inbound requests are interpreted, for example, using an interceptor for each running application to intercept the requests and the corresponding response data. The responses are read and the request/response data 110 is combined into data features. Step 210 may analyze, for example, HTTP Gateway traffic, Application Server Request/Response data; and/or Web Services Description Language (WSDL) descriptions of a service, if available.

During step 220, the exemplary microservice specification generation process 200 mines the audit logs and/or transaction logs 120 of the application to identify one or more interactions with a data store, as discussed further below in conjunction with FIG. 6. A distinct parser is optionally employed during step 220 for each log source type, as discussed below. Generally, the request analyzers of FIG. 5 read transaction logs (e.g., SQL data store logs or audit/transaction logs) and group related reads/writes/updates/deletes to obtain data store interactions.

During step 230, the exemplary microservice specification generation process 200 categorizes the necessary service type(s), as discussed further below in conjunction with FIGS. 7-11. Generally, the service categorization involves (i) clustering the one or more data store interactions using an unsupervised learning technique to identify one or more patterns of usage of the data store (e.g., clustering the data store interactions based on an identifier of a calling application, a process identifier, a network address, a timestamp and/or one or more join operations); (ii) categorizing the service(s) (e.g., using supervised machine learning models to select service type(s) to be generated for the requests/corresponding response data and data store interactions); and (iii) generating API, Data Model and/or Message specifications 150 for the selected service type(s) for a microservice implementation of the application. Generally, a message specification defines a message destination and required update notifications among a plurality of services.

A persistence type can optionally be specified for the selected service type(s). For example, a Polyglot Persistence type can be specified when storing data, to use multiple data storage technologies, based upon the way data is being used by applications or application components (e.g., different data types are best dealt with different data stores).

During step 240, the exemplary microservice specification generation process 200 generates the required microservices for the target run-time environment based on the application programming interface specification for the selected service type(s), during a microservice Generation phase, as discussed further below in conjunction with FIGS. 12 and 13. In addition, a data definition language and/or message queues can also be generated based on, respectively, the data model and the message specification for the selected service type(s).

FIG. 3 is a flow chart illustrating an exemplary implementation of a microservice specification generation process 300, according to one embodiment of the disclosure. As shown in FIG. 3, the exemplary microservice specification generation process 300 receives request/response data 335 from a data power gateway 310, an API gateway 320 and/or an SOA application server 330. In addition, the exemplary microservice specification generation process 300 receives logs/traces data 360 from, for example, a mongo database 362, an SQL server 364 and/or an Oracle database 366. In one or more embodiments, the exemplary microservice specification generation process 300 comprises a microservice detection module 340 and a microservice generator module 370.

As shown in FIG. 3, the exemplary microservice detection module 340 processes the request/response data 335 and logs/traces data 360 using request analyzers 342, audit/transaction log mining techniques 344 and service categorization module 346 to generate API, Data Model and/or Message specifications 350 for the selected service type(s) for a microservice implementation of the application, in a similar manner as steps 210, 220, 230, respectively, of FIG. 2.

The exemplary microservice generator module 370 generates Pivotal Cloud Foundry (PCF) executables 375, in a similar manner as step 240 of FIG. 2. For example, the PCF executables 375 may comprise the required microservices for the target run-time environment based on the application programming interface specification for the selected service type(s), as well as, optionally, a data definition language and/or message queues based on, respectively, the data model and the message specification for the selected service type(s).

Figure 4:
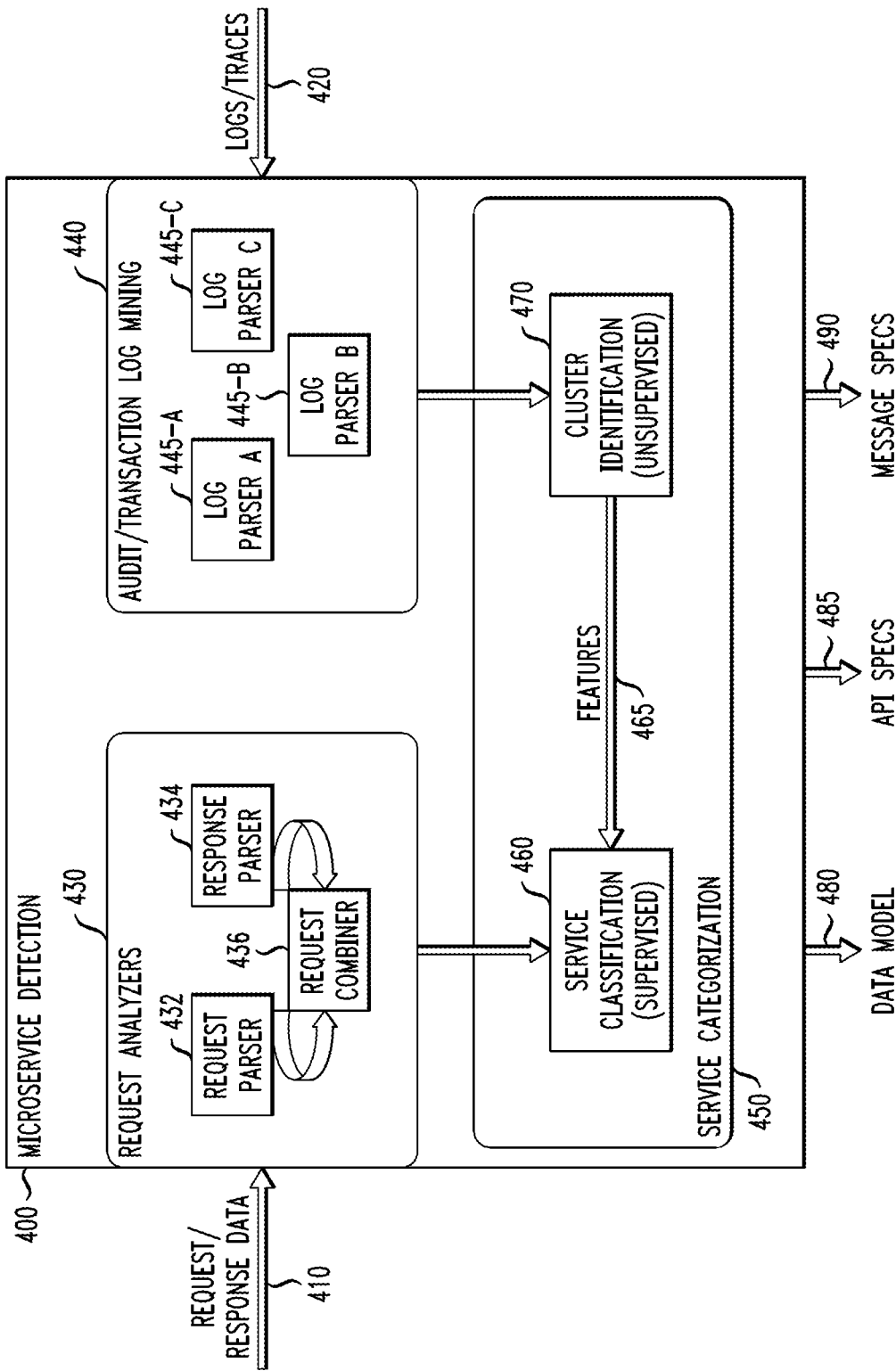
FIG. 4 illustrates the microservice detection module of FIG. 3 in further detail, according to some embodiments of the disclosure.

FIG. 4 illustrates the microservice detection module 340 of FIG. 3 in further detail, according to some embodiments of the disclosure. As shown in FIG. 4, the exemplary microservice detection module 400 receives request/response data 410 and logs/traces data 420, in a similar manner as FIG. 3. As shown in FIG. 4, exemplary request analyzers 430 process the request/response data 410 using request parsers 432 and 434, and a request combiner 436 to combine the various requests and generate features comprising key attributes to narrow the space of relevant features, in a similar manner as FIGS. 2 and 3.

Likewise, the exemplary microservice detection module 400 comprises an audit/transaction log mining module 440 to process the logs/traces data 420. In the embodiment of FIG. 4, the exemplary audit/transaction log mining module 440 comprises a plurality of distinct log parsers 445-A through 445-C for each log source type. Generally, the log parsers 445 parse the logs/traces data 420 of the application to identify interactions with a data store.

As shown in FIG. 4, the exemplary microservice detection module 400 further comprises a service categorization module 450, that can be implemented in a similar manner as the service categorization module module 346 of FIG. 3. The service categorization module 450 comprises a service classification module 460, as discussed further below in conjunction with FIG. 11, that employs supervised machine learning techniques and a cluster identification module 470, as discussed further below in conjunction with FIGS. 9 and 10, that employs unsupervised machine learning techniques and provides features 465 to the service classification module 460.

The service categorization module 450 generates the Data Model specification 480, API specification 485 and/or a Message specification 490 for the selected service type(s) for a microservice implementation of the application.

Figure 5:
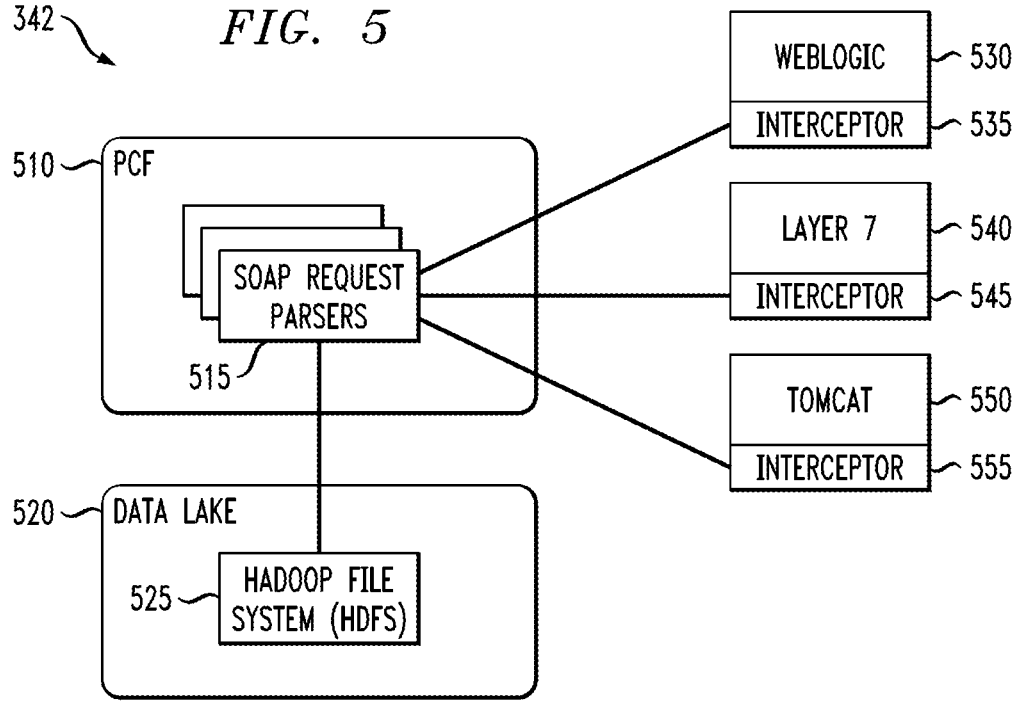
FIG. 5 illustrates the request analyzers of FIG. 3 in further detail, according to some embodiments.

FIG. 5 illustrates the request analyzers 342 of FIG. 3 in further detail, according to some embodiments. Generally, the request analyzers 342 collect the request/response data 335 (FIG. 3) from different sources and runtime environments for monolithic or SOA applications.

In some embodiments, the collection of HTTP request/response data 335 will be performed by adding interceptors 535, 545, 555 to the running applications that pick up request and response data from users. For example, as shown in FIG. 5, a Servlet filter can be added as an interceptor 535 to a Weblogic server 530; an interceptor 545 can be added to a Layer 7 API server 540; and an interceptor 555 can be added to a Tomcat Application Server 550, to capture and output the Simple Object Access Protocol (SOAP) requests and responses. The interceptors 535, 545, 555 will also be responsible for delivery of request and response data to the request parsers 515 of FIG. 5.

SOAP is a standard format for SOA Applications. SOAP is also defined by a WSDL. The request parsers 515 can be implemented as SOAP request parsers in the PCF 510 that can be responsible for taking any request and response combination and performing any necessary preprocessing of the data before saving the data down to a Hadoop File System (HDFS) 525 in a data lake 520. The HDFS layer will be the destination for the processed requests and responses. This data will be leveraged in later phases by the analytical components, as discussed further below. The format of the data stored will likely be Avro.

Figure 6:
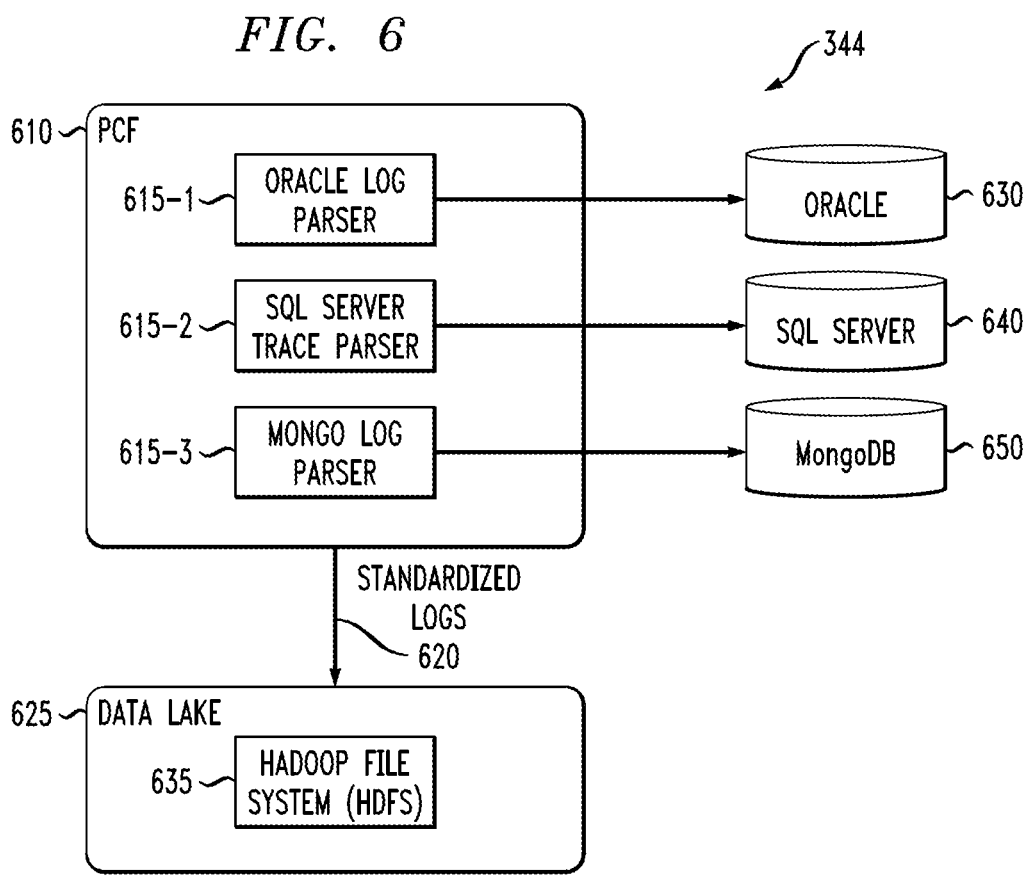
FIG. 6 illustrates the audit/transaction log mining techniques of FIG. 3 in further detail, according to one embodiment.

FIG. 6 illustrates the audit/transaction log mining techniques 344 of FIG. 3 in further detail, according to one embodiment. Generally, the transaction log phase is a critical data point for subsequent analysis. This log dataset combined with the request and response data is used when categorizing the services to generate in the service categorization module 346 of FIG. 3.

Transaction logs are present, for example, in all SQL based data stores. Depending on the source type, the transaction log may just capture the Create/Update/Delete changes to the data store. To properly categorize the data access, it will also be necessary to know the Select operations that are performed as well. For example, SQL servers support a trace feature, where all Select and Update operations are captured. The Select and Update operations are then fed in to the system as complete data sets.

As shown in FIG. 6, the audit/transaction log sources can be broad. The example of FIG. 6 shows an Oracle database 630, a SQL server 640 and a Mongo database 650 as three exemplary data sources but many more sources can be incorporated, as needed, as would be apparent to a person of ordinary skill in the art, based on the present disclosure. Each target source system 630, 640, 650 can have its own format for logs and will have its own process for retrieving the log data. This will require log parsers for each type of Data store being used in one or more embodiments.

In the embodiment of FIG. 6 there is a distinct log parser 615-1 through 615-3 in the PCF 610 corresponding to a given one of the three exemplary data sources 630, 640, 650. The exemplary log parsers 615-1 through 615-3 pull the log and audit data from the corresponding data source 630, 640, 650.

For example, with the Oracle database 630, Oracle Log-Miner and/or Oracle Streams can be used in the Oracle log parser 615-1. Similar techniques will be used for other sources.

Once the logs have been parsed from the source system 630, 640, 650, the parsed logs will be persisted to the HDFS 635 in the data lake 625. The parser may standardize the format of the logs 620 but that will be a design choice. Regardless of the format the data will be persisted to HDFS along with metadata that will help associating the request with the Transaction logs (e.g Calling client IP, session ID).

Figure 7:
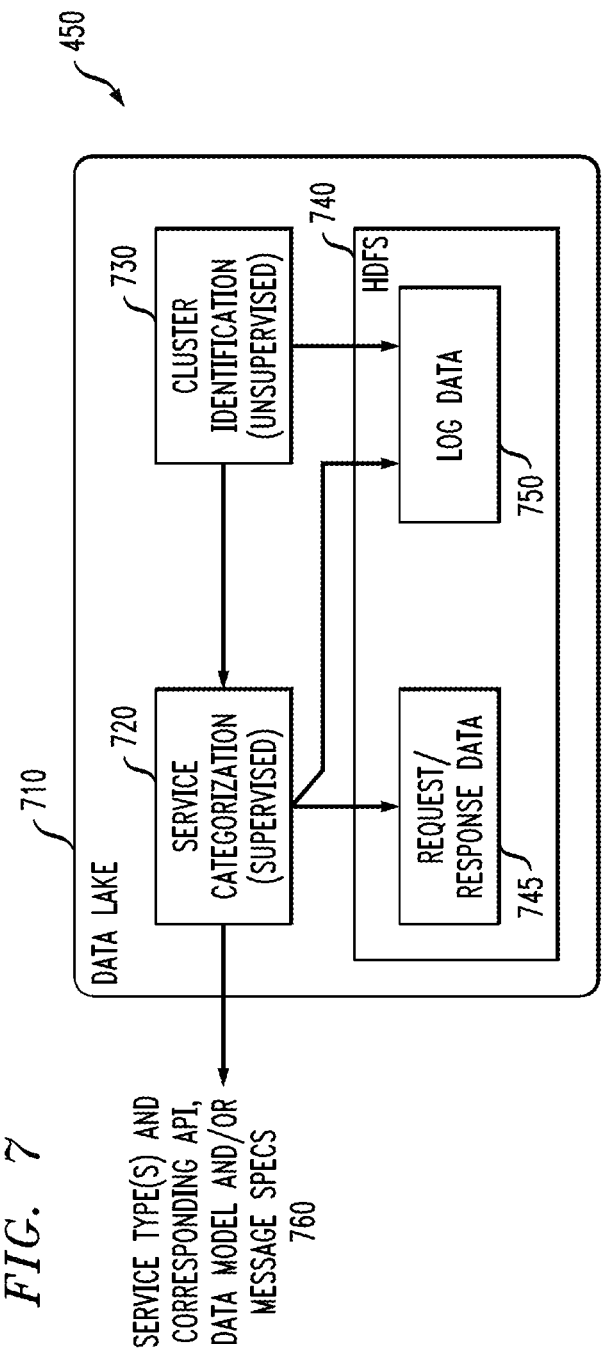
FIG. 7 illustrates the service categorization module of FIG. 4 in further detail, according to some embodiments.

FIG. 7 illustrates the service categorization module 450 of FIG. 4 in further detail, according to one embodiment. As shown in FIG. 7, the exemplary service categorization module 450 is implemented in a data lake 710 and comprises a service categorization stage 720 that categorizes the type of services and corresponding specifications 760 to generate (using supervised machine learning techniques) and a cluster identification stage 730 to identify the clusters of related log data 750 based on interactions with the data store (using unsupervised machine learning techniques). The supervised machine learning techniques may include, for example, regression models and decision trees.

In some embodiments, the service categorization module 450 relies on the captured data from the previous steps and modules. The supervised machine learning techniques of the exemplary service categorization stage 720 and the unsupervised machine learning techniques of the cluster identification stage 730 are discussed further below in conjunction with FIGS. 9-11.

Figure 8:
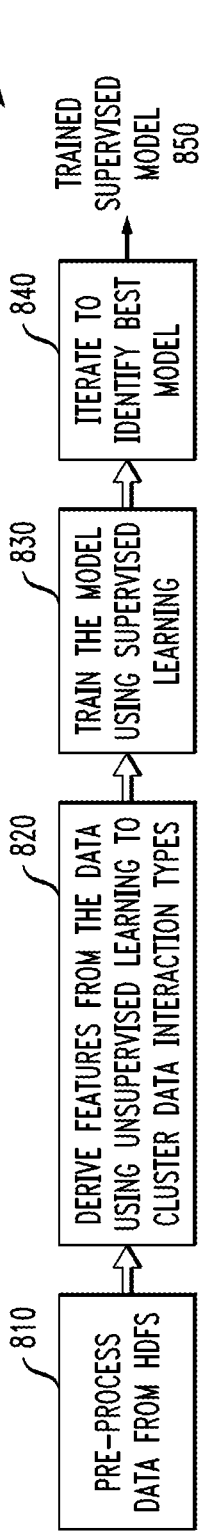
FIG. 8 is a flow chart illustrating an exemplary implementation of a training process for training the supervised model of the exemplary service categorization stage of FIG. 7, according to one embodiment of the disclosure.

FIG. 8 is a flow chart illustrating an exemplary implementation of a training process 800 for training the supervised model of the exemplary service categorization stage 720 of FIG. 7, according to one embodiment of the disclosure. Generally, the exemplary training process 800 trains the supervised machine learning models using a plurality of features derived from the requests, the corresponding response data and the data store interactions.

As shown in FIG. 8, step 810 pre-processes the request/response/data store interaction data 745 by iterating through the HDFS datasets 740 to select relevant data points for categorization. Thereafter, the exemplary training process 800 derives features from the data during step 820 using the unsupervised learning model to cluster the data interaction types (as discussed further below in conjunction with FIG. 9). Some pre-known features can optionally be added (e.g., an initial list of request/response pairs for known services).

During step 830, the exemplary training process 800 trains the machine learning model using supervised learning techniques. In some embodiments, the input is provided to the supervised machine learning model to best help categorize the services.

Finally, during step 840, the exemplary training process 800 iterates through the different machine learning algorithms to evaluate the respective accuracies, relative to a manual classification, and to adjust both the unsupervised and supervised models (e.g., add or remove features to get more accurate results). The exemplary training process 800 generates a trained supervised machine learning model 850.

FIG. 9 illustrates the functionality of the cluster identification module 470 of FIG. 4 in further detail, according to an embodiment. As noted above, the cluster identification module 470 will leverage unsupervised learning techniques to identify patterns of usage of the data store and/or to prepare features that will be applied to the classification model that is part of the service categorization phase 720 (FIG. 7). In the example of FIG. 9, the cluster identification module 470 identifies a plurality of clusters 910-1 through 910-N of data store interactions. Conceptually, the example of FIG. 9 illustrates read operations on the Y Axis and write operations on the X-Axis. In further variations, the graph of FIG. 9 can be considered a box that represents the whole ecosystem as a mechanism for finding unusual patterns.

In some embodiments, the clustering employs soft clustering with initially a Gaussian Mixture model (GMM) to identify clusters of interactions with the data store.

As shown in FIG. 9, example clusters of data store usage patterns expected are:
 Simple Read queries of the data store (corresponding to cluster 910-1);
 Multi Table/Schema queries;
 Combinations of queries (e.g., Read then Update, corresponding to cluster 910-2); and
 Data Manipulation (e.g., Temporary Table creations), corresponding to cluster 910-N.

In one or more embodiments, the cluster identification of FIG. 9 will continuously analyze in-bound log data because there are some known usage patterns (as above) but there will be different usage patterns leveraged by different application teams and those are all not initially known. If any new usage clusters 910 are identified, they are applied to the classification model.

FIG. 10 illustrates a number of exemplary techniques 1000 for identifying patterns as part of the cluster identification of FIG. 9, according to one or more embodiments of the disclosure. In the example of FIG. 10 clusters of data store interactions can be identified by grouping by username of the calling application, or by process ID (pid) to see which queries are part of the same process. In further variations, the IP addresses can be evaluated to distinguish how many instances of the current service is running. In yet another variation, the requests and responses are ordered by timestamp to see groupings that happen at a similar time frame, which may be part of a batch run. Finally, the queries being used can be parsed to detect tables and if any join operations are being used (e.g., joins across tables, to see what is grouped).

FIG. 11 illustrates an exemplary implementation of the service categorization module 1100 of FIGS. 4 and 7, according to one embodiment. As shown in FIG. 11, the exemplary service categorization module 1100 is implemented in a data lake 1110 and comprises a service categorization stage 1120 implemented as a decision tree that categorizes the type of services and corresponding specifications 1160 to generate using supervised machine learning techniques.

The supervised machine learning techniques of the decision trees in the exemplary service categorization stage 1120 are implemented using the trained supervised machine learning model, generated, for example, by the training process 800 of FIG. 8.

Generally, the decision trees make decisions at each branch based on extracted features to select (at a leaf node) one or more service(s) for each request/response/data interaction type triplet.

As shown in FIG. 11, the service categorization module 1120 will inspect the request/response data 1135 in the HDFS 1130 and combine it with the log data 1140. The model will be built up from known groupings of data store access patterns, as discussed above.

The exemplary decision tree classification algorithm will combine the requests and corresponding responses in the request/response data 1135 of the SOA application (e.g., based on time stamp or client address, as discussed above in conjunction with FIG. 10) along with the log data points in the log data 1140 and select the correct type of service to generate. Based on the log data 1140 more than one service may be generated as the output 1160, so the exemplary decision tree classification algorithm may execute multiple times on the log data 1140 to identify all the outputs. Other Classification Algorithms will also be investigated, as would be apparent to a person of ordinary skill in the art.

As noted above, the output of the service categorization module 1100 comprises the selected service type(s) and corresponding API, Data Model and/or Message specifications 1160. For example, the API specification may follow the Open API standard.

Figure 12:
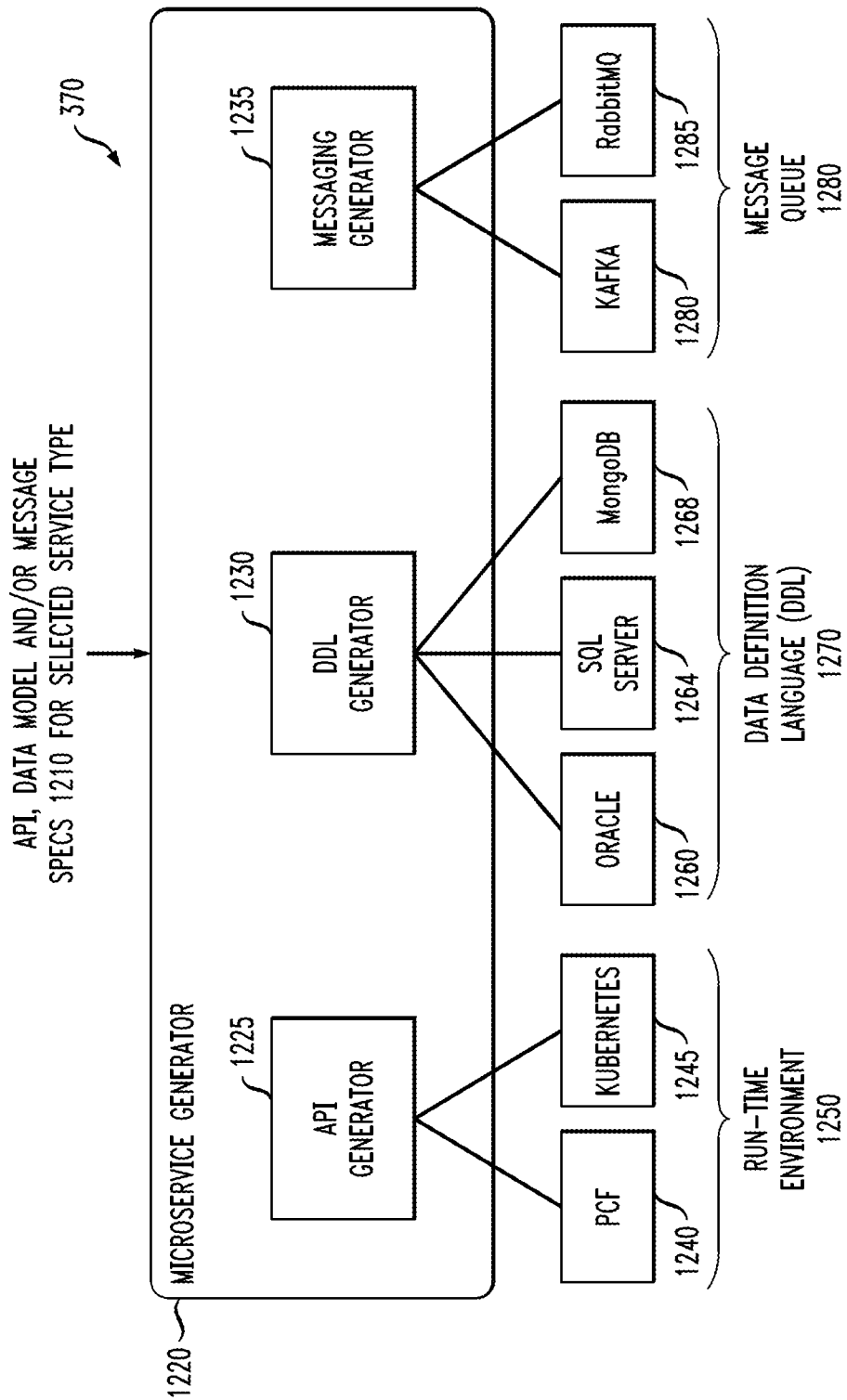
FIG. 12 illustrates the microservice generation module of FIG. 3 in further detail, according to some embodiments.

FIG. 12 illustrates the microservice generation module 370 of FIG. 3 in further detail, according to some embodiments. Generally, the microservice generation phase is the last step of the process and produces executable Services that can be deployed in run-time environments. Data store and messaging definitions may also optionally be generated.

As shown in FIG. 12, the exemplary microservice generation module 370 comprises a microservice generator 1220 that processes the API, Data Model and/or Message specifications 1210 for the one or more selected service types. The exemplary microservice generator 1220 comprises an API Generator 1225, a DDL (data description language) Generator 1230, and a Messaging Generator 1235.

Generally, in one or more embodiments, the API Generator 1225 will generate the Rest API that was identified in the Classification phase. The API will be generated to conform with the Open API specification. The API Generator 1225 processes some user preferences regarding generating a binary that executes in a run-time environment 1250 of PCF 1240 or Kubernetes 1245. Further run-times can be added easily.

In some embodiments, the DDL Generator 1230 is optionally triggered if the Classification dictates that the data model should be split. Depending on the user preference, a DDL 1270 can be generated for one or more databases, such as an Oracle database 1260, a SQL server database 1264 and/or a Mongo database 1268.

In at least one embodiment, the Messaging Generator 1235 may generate a messaging queue/stream 1280, if the Classification defines that the selected service(s) is/are making a change to the data. This will then be used by the generated service to generate events upon a change of the data, as discussed below in conjunction with FIG. 14. The messaging queue/stream 1280 may be implemented, for example, using Kafka messaging 1280 or RabbitMQ messaging 1285.

Generation of the messaging queue/stream 1280 will facilitate transaction-like behavior because after splitting a monolithic the traditional type of transactions will not function in a microservice solution.

Figure 13:
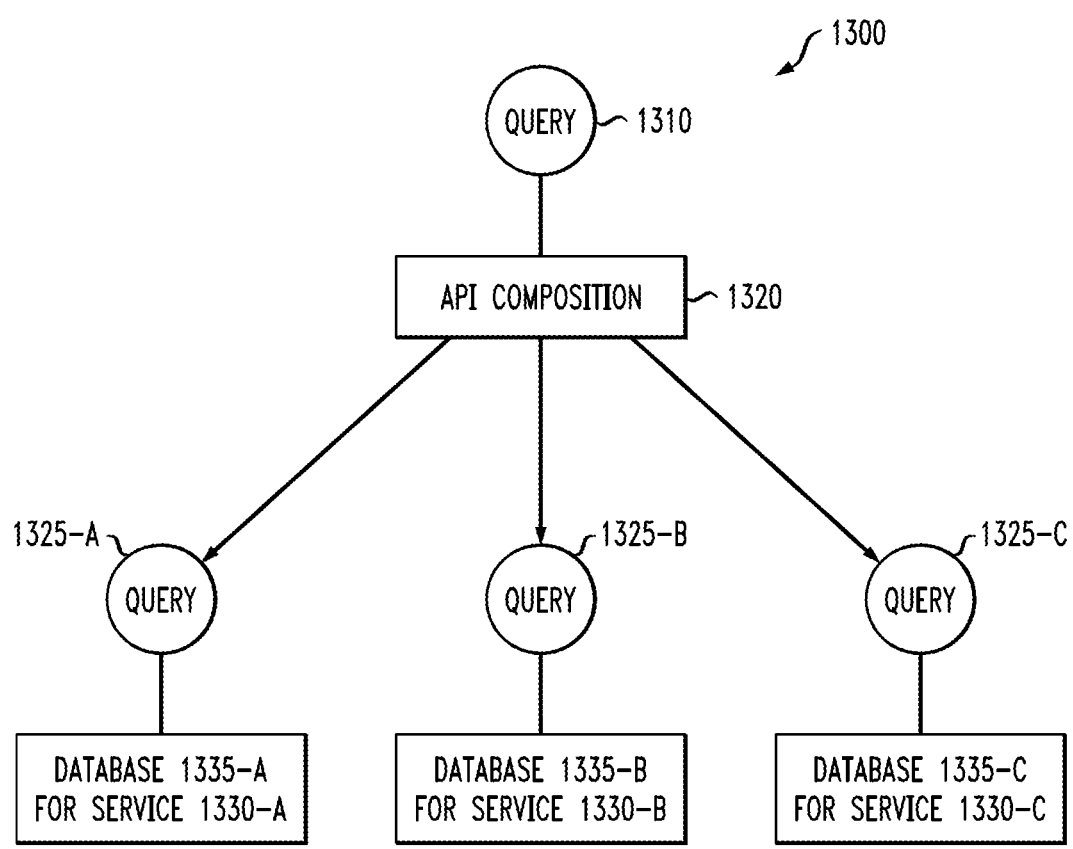
FIG. 13 illustrates the processing of a query for three exemplary services automatically generated in according with one or more embodiments of the disclosure.

FIG. 13 illustrates the processing 1300 of a query 1310 for three exemplary services 1330-A through 1330-C automatically generated in according with one or more embodiments of the disclosure. The service categorization module 720 of FIG. 7, for example, analyzes the requests/response data 745 and determines that an SOA service implementation generates three microservices at the data layer. Then, based on the data returned by the three microservices 1330-A through 1330-C, the response can be inspected and validated if all of the data points are present.

In the example of FIG. 13, the API Composition service 1320 processes the query 1310 and aggregates Services 1330-A through 1330-C and replicates the SOA service. It can be challenging to implement queries that join data from multiple services. The example query 1310 can be implemented in a microservices architecture by performing an API composition 1320 that invokes the three services 1330-A through 1330-C using respective queries 1325-A through 1325 C that own the data in respective databases 1335-A through 1335-C and joins the results.

Figure 14:
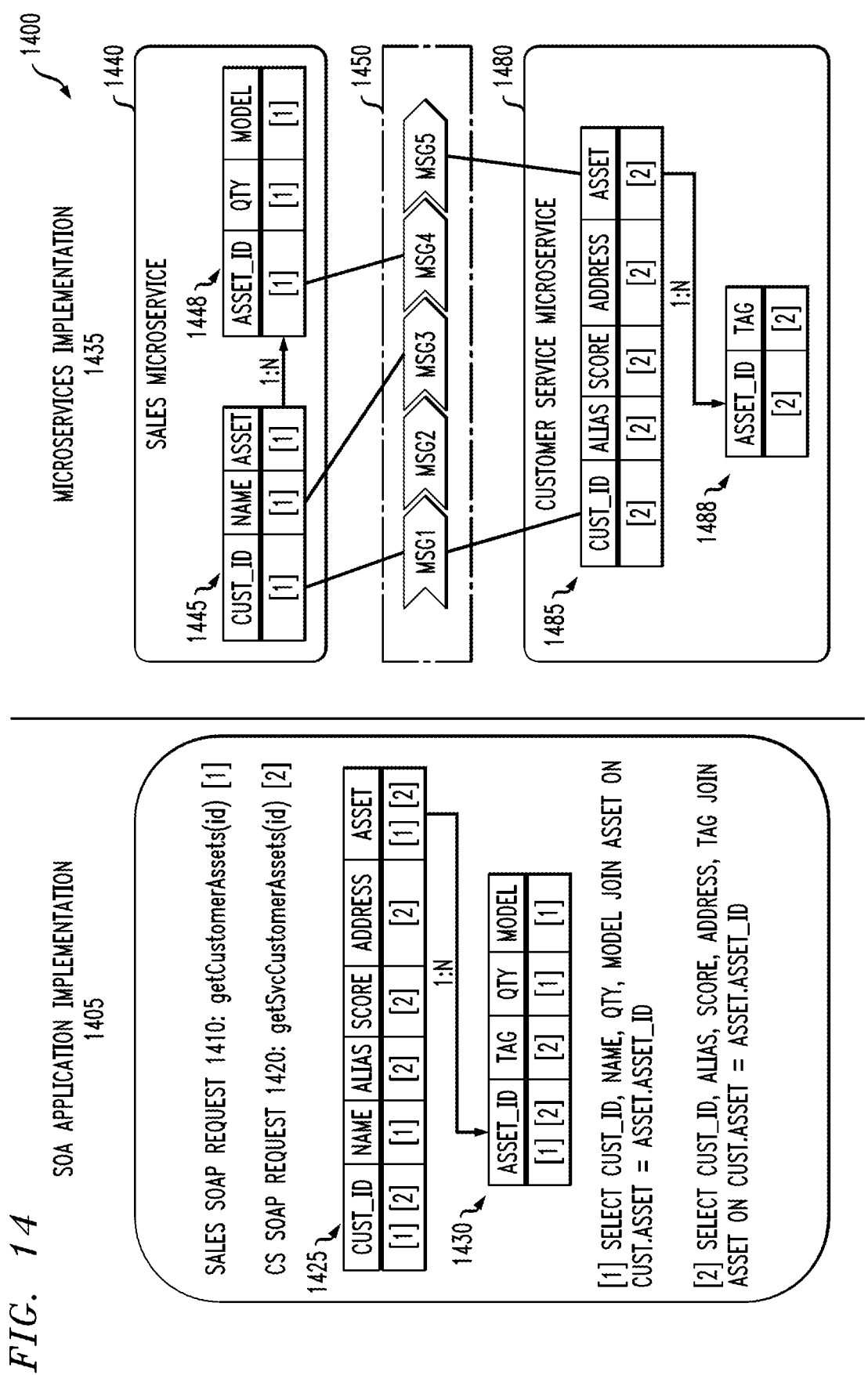
FIG. 14 provides an example of different queries being processed by a number of services on the same data, according to an embodiment.

FIG. 14 provides an example 1400 of different queries being processed by a number of services on the same data, according to an embodiment. As shown in FIG. 14, a given SOA application implementation 1405 processes a sales SOAP request 1410 and a customer service (CS) SOAP request 1420 on the same data tables 1425 and 1430. The sales SOAP request 1410 is directed to the data elements tagged marked with a "[1]," while the CS SOAP request 1420 is directed to the data elements tagged marked with a "[2]," based on the select and join operations defined for "[1]," and "[2]" below the data table 1430.

When the existing SOA application implementation 1405 is split into a microservices implementation 1435 using the disclosed techniques, there are no longer global transactions (e.g., where commits are performed all at once). The exemplary microservices implementation 1435 comprises a sales microservice 1440, with its own schema and data set, and a customer service microservice 1480, also with its own schema and data set. The microservices 1440 and 1480 can publish messages to an event stream 1450, based on the generated message specification (e.g., notifications of state changes).

A given service 1440 and 1480 can be a publisher, consumer or uninterested in a particular message in the event stream 1450. For example, the sales microservice 1440 is a publisher of message msg1, and the customer service microservice 1480 is a consumer of message msg1.

When a given service 1440 or 1480 updates data, for example, in data tables 1445/1448 or 1485/1488, respectively, the given service may need to notify other services of the change, by publishing a message to the event stream 1450, because the data stores of other services may need to be updated accordingly. Each service 1440 and 1480 can monitor the event stream 1450 based on the message specification.

In one or more embodiments, the disclosed techniques for automatically generating microservice specifications accelerate the path and/or reduce the costs of migrating from an SOA implementation to a microservices implementation. In some embodiments, the disclosed techniques for automatically generating microservice specifications can be packaged as a migration tool to Pivotal Cloud Foundry, or another cloud foundry. In addition, some embodiments of the disclosed techniques ensure a consistent application of best practices and increased quality.

One or more embodiments of the disclosure provide improved methods, apparatus and computer program products for automatically generating microservice specifications. The foregoing applications and associated embodiments should be considered as illustrative only, and numerous other embodiments can be configured using the techniques disclosed herein, in a wide variety of different applications.

It should also be understood that the disclosed microservice specifications generation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatically generating microservice specifications may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based microservice specifications generation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based microservice specifications generation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. These platforms may also be used to implement at least portions of other information processing systems in other embodiments.

Figure 15:
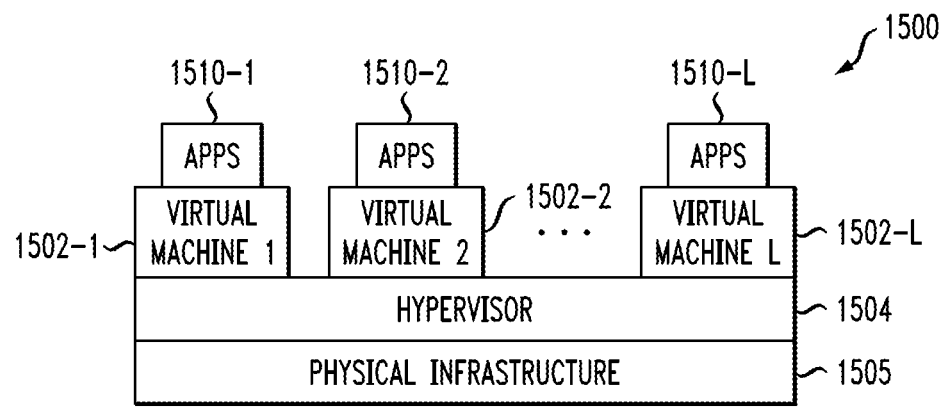
FIG. 15 illustrates an exemplary processing platform that may be used to implement at least a portion of one or more embodiments of the disclosure comprising a cloud infrastructure.

Referring now to FIG. 15, one possible processing platform that may be used to implement at least a portion of one or more embodiments of the disclosure comprises cloud infrastructure 1500. The cloud infrastructure 1500 in this exemplary processing platform comprises virtual machines (VMs) 1502-1, 1502-2, . . . 1502-L implemented using a hypervisor 1504. The hypervisor 1504 runs on physical infrastructure 1505. The cloud infrastructure 1500 further comprises sets of applications 1510-1, 1510-2, . . . 1510-L running on respective ones of the virtual machines 1502-1, 1502-2, . . . 1502-L under the control of the hypervisor 1504.

The cloud infrastructure 1500 may encompass the entire given system or only portions of that given system, such as one or more of client, servers, controllers, or computing devices in the system.

Although only a single hypervisor 1504 is shown in the embodiment of FIG. 15, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 1504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based microservice specifications generation engine in an illustrative embodiment include VNX® and Symmetrix VMAX® storage arrays, software-defined storage products such as ScaleIO™ and ViPR®, all-flash and hybrid flash storage arrays such as Unity™ cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based microservice specifications generation apparatus may each run on a computer, server, storage device or other processing platform element. A given such element may be viewed as an example of what is more generally referred to herein as a "processing device." The cloud infrastructure 1500 shown in FIG. 15 may represent at least a portion of one processing platform.

Figure 16:
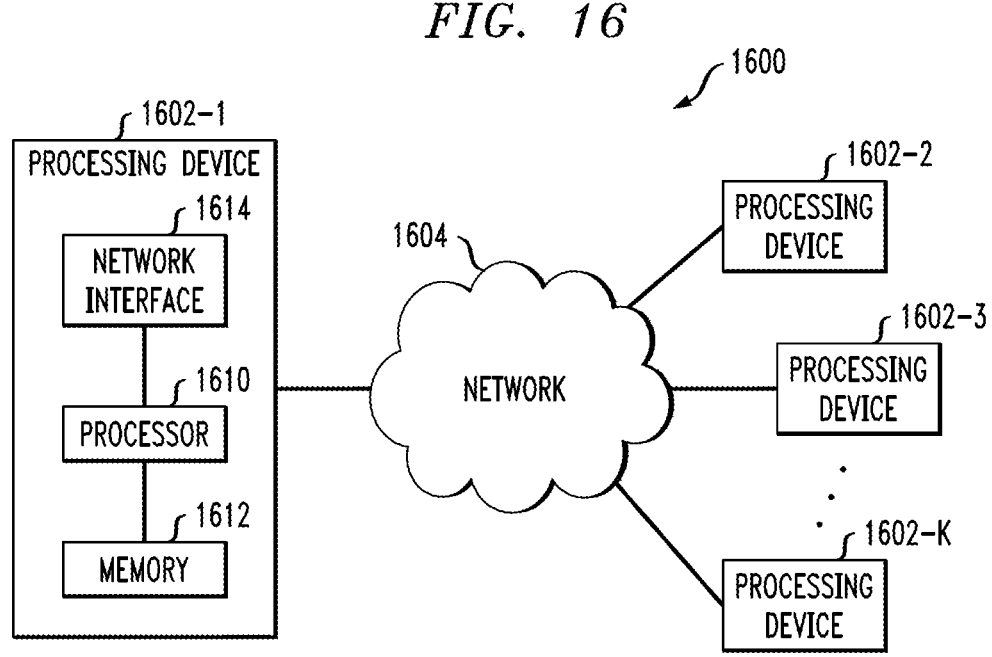
FIG. 16 illustrates another exemplary processing platform that may be used to implement at least a portion of one or more embodiments of the disclosure.

Another example of a processing platform is processing platform 1600 shown in FIG. 16. The processing platform 1600 in this embodiment comprises at least a portion of the given system and includes a plurality of processing devices, denoted 1602-1, 1602-2, 1602-3, . . . 1602-K, which communicate with one another over a network 1604. The network 1604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1602-1 in the processing platform 1600 comprises a processor 1610 coupled to a memory 1612. The processor 1610 may comprise a microprocessor, a microcontroller, an application specific integrated circuit (ASIC), a field programmable gate array (FPGA) or other type of processing circuitry, as well as portions or combinations of such circuitry elements, and the memory 1612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 15 or 16, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
analyzing, using at least one processing device, request data and corresponding response data for at least one application to generate one or more data features;
parsing, using the at least one processing device, one or more of an audit log and a transaction log of the at least one application to identify one or more interactions with a data store;
clustering, using the at least one processing device, the one or more data store interactions using an unsupervised learning technique to identify one or more patterns of usage of the data store;
selecting, using the at least one processing device, one or more service types to generate, using one or more trained supervised machine learning models for the requests, the corresponding response data and the data store interactions; and
generating, using the at least one processing device, at least one of an application programming interface specification, a data model specification and a message specification for the one or more selected service types for a microservice implementation of the at least one application.

2. The method of claim 1, wherein the at least one application is implemented as one or more of a monolithic application and a Service Oriented Architecture application.

3. The method of claim 1, wherein the step of analyzing employs an interceptor for each running application to intercept the requests and the corresponding response data.

4. The method of claim 1, wherein the step of parsing employs a distinct parser for each log source type.

5. The method of claim 1, wherein the step of clustering groups the data store interactions based on one or more of an identifier of a calling application, a process identifier, a network address, a timestamp and one or more join operations.

6. The method of claim 1, wherein the message specification defines a message destination and update notifications among a plurality of services.

7. The method of claim 1, further comprising the step of generating one or more of a run-time environment, a data definition language and one or more message queues based on, respectively, the application programming interface specification, the data model and the message specification for the one or more selected service types.

8. The method of claim 1, wherein the one or more trained supervised machine learning models are trained using a plurality of the data features derived from the requests, the corresponding response data and the data store interactions.

9. A system, comprising:
a memory; and
at least one processing device, coupled to the memory, operative to implement the following steps:
analyzing, using the at least one processing device, request data and corresponding response data for at least one application to generate one or more data features;
parsing, using the at least one processing device, one or more of an audit log and a transaction log of the at least one application to identify one or more interactions with a data store;
clustering, using the at least one processing device, the one or more data store interactions using an unsupervised learning technique to identify one or more patterns of usage of the data store;
selecting, using the at least one processing device, one or more service types to generate, using one or more trained supervised machine learning models for the requests, the corresponding response data and the data store interactions; and generating, using the at least one processing device, at least one of an application programming interface specification, a data model specification and a message specification for the one or more selected service types for a microservice implementation of the at least one application.

10. The system of claim 9, wherein the step of analyzing employs an interceptor for each running application to intercept the requests and the corresponding response data.

11. The system of claim 9, wherein the step of parsing employs a distinct parser for each log source type.

12. The system of claim 9, wherein the step of clustering groups the data store interactions based on one or more of an identifier of a calling application, a process identifier, a network address, a timestamp and one or more join operations.

13. The system of claim 9, wherein the message specification defines a message destination and update notifications among a plurality of services.

14. The system of claim 9, further comprising the step of generating one or more of a run-time environment, a data definition language and one or more message queues based on, respectively, the application programming interface specification, the data model and the message specification for the one or more selected service types.

15. The system of claim 9, wherein the one or more trained supervised machine learning models are trained using a plurality of the data features derived from the requests, the corresponding response data and the data store interactions.

16. A computer program product, comprising a tangible machine-readable storage medium having encoded therein executable code of one or more software programs, wherein the one or more software programs when executed by at least one processing device perform the following steps:

analyzing, using at least one processing device, request data and corresponding response data for at least one application to generate one or more data features;

parsing, using the at least one processing device, one or more of an audit log and a transaction log of the at least one application to identify one or more interactions with a data store;

clustering, using the at least one processing device, the one or more data store interactions using an unsupervised learning technique to identify one or more patterns of usage of the data store;

selecting, using the at least one processing device, one or more service types to generate, using one or more trained supervised machine learning models for the requests, the corresponding response data and the data store interactions; and generating, using the at least one processing device, at least one of an application programming interface specification, a data model specification and a message specification for the one or more selected service types for a microservice implementation of the at least one application.

17. The computer program product of claim 16, wherein the step of analyzing employs an interceptor for each running application to intercept the requests and the corresponding response data and the step of parsing employs a distinct parser for each log source type.

18. The computer program product of claim 16, wherein the step of clustering groups the data store interactions based on one or more of an identifier of a calling application, a process identifier, a network address, a timestamp and one or more join operations.

19. The computer program product of claim 16, further comprising the step of generating one or more of a run-time environment, a data definition language and one or more message queues based on, respectively, the application programming interface specification, the data model and the message specification for the one or more selected service types.

20. The computer program product of claim 16, wherein the one or more trained supervised machine learning models are trained using a plurality of the data features derived from the requests, the corresponding response data and the data store interactions.

* * * * *